(12) United States Patent
Park et al.

(10) Patent No.: US 7,369,884 B2
(45) Date of Patent: May 6, 2008

(54) SLIDE ASSEMBLY

(75) Inventors: Hong-Jae Park, Valby (DK); Nikolaj Bestle, Copenhagen K (DK)

(73) Assignee: Nokia Corporation, Espoo (FI)

( * ) Notice: Subject to any disclaimer, the term of this patent is extended or adjusted under 35 U.S.C. 154(b) by 774 days.

(21) Appl. No.: 10/873,565

(22) Filed: Jun. 22, 2004

(65) Prior Publication Data

US 2005/0282597 A1 Dec. 22, 2005

(51) Int. Cl.
*H04Q 7/32* (2006.01)

(52) U.S. Cl. .............................. 455/575.4; 455/575.1; 455/550.1; 455/90.3; 455/90.2; 455/90.1; 455/422.1; 379/433.01; 379/433.11; 379/440; 379/433.12; 348/14.01; 348/14.02; 348/239

(58) Field of Classification Search ............. 455/575.4, 455/575.1, 550.1, 90.3, 551, 556.1, 515.1, 455/557, 90.1, 90.2, 73, 422.1, 500, 517, 455/574.4, 575.3; 379/433.01, 566.1, 428.01, 379/428.02, 433.12, 433.11, 440, 431; 348/433.11, 348/14.01, 14.02, 239, 515.3, 515.8, 90.1, 348/90.2, 73, 500, 517, 422.1, 40.3; D14/137, D14/138, 140, 147, 188
See application file for complete search history.

(56) References Cited

U.S. PATENT DOCUMENTS

| | | | |
|---|---|---|---|
| 7,158,818 B2 * | 1/2007 | Lee | 455/575.4 |
| 2005/0049019 A1 * | 3/2005 | Lee | 455/575.4 |
| 2005/0128322 A1 * | 6/2005 | Eaton et al. | 348/239 |

FOREIGN PATENT DOCUMENTS

EP 1 075 125 2/2001

* cited by examiner

*Primary Examiner*—Keith Ferguson
(74) *Attorney, Agent, or Firm*—Perman & Green, LLP

(57) ABSTRACT

A sliding assembly for a keypad protection cover of a telephone handset including at least one slide spring to urge the keypad protection cover in either the open or the closed position.

21 Claims, 5 Drawing Sheets

SLIDE ASSEMBLY

The present invention relates to the field of slide assemblies for use in handsets, e.g., mobile phones or wireless phones, and relates more specifically to the field of slide assemblies that force a movable member to one of two extreme positions.

BACKGROUND

Telephone handsets comprise slidably disposed components such as keypad protection covers. An exemplary slide assembly is disclosed by EP 1 075 125. This document discloses the Nokia 7110® mobile phone, which is provided with a sliding cover construction that protects the keypad. The sliding cover is used in either of two extreme positions, namely, in the closed or in the open position. Intermediate positions between the two extreme positions are only passed when moving from the one extreme position to the other, whilst it is undesirable for the cover to remain at any intermediate position. The Nokia 7110® phone is retained in the closed position by a snap lock and urged by resilient means to the open position. A cover ejection key on the rear side of the phone releases the keypad protection cover to slide to the open position. The keypad protection cover is manually pushed back to the closed position and retained there by the snap lock.

Hinges which are biased to both open and closed positions by a resiliently-biasing over-center mechanism have been used in handsets with hinged keypad protection covers. Over-center mechanisms are however less suitable for sliding elements.

SUMMARY

The invention described below provides a slide assembly for controlling the movement of a sliding component of a telephone handset along a slide path between first and second extreme positions via a predetermined intermediate position. The slide assembly may comprise at least one slide spring disposed along the slide path, and a plug member connected to the sliding component to move in unison therewith. The slide spring and the plug member are preferably configured to urge the sliding member towards the first extreme position when the sliding member is positioned between the first extreme position and the intermediate position, and the slide spring and the plug member are preferably configured to urge the sliding member towards the second extreme position when the sliding member is positioned between the second extreme position and the intermediate position.

In some embodiments, the slide assembly provides a sliding characteristic that may be perceived as attractive by users, and/or may be simple, reliable, and/or suitable for mass production.

In many embodiments, no additional locking means will normally be required for retaining the sliding component in any of the extreme positions.

In some embodiments, the slide spring may be a leaf spring, and/or the spring may have a fixed end adjacent one of the first and second extreme positions, and a free end adjacent the other of the first and second extreme positions, the slide spring extending between the free end and the fixed end in an unloaded state in a non-rectilinear fashion.

The plug member may be guided along the path to engage and deform the slide spring, whereby a maximum deformation of the slide spring may occur at the intermediate position.

In many embodiments, the plug member may deform the slide spring towards a rectilinear shape when the plug member moves from one of the extreme positions towards the intermediate position.

In another embodiment, the slide spring is curved in the unloaded state, with a rising segment, followed at the intermediate position by a falling segment.

According to yet another embodiment, the slide spring comprises, in the unloaded state, a substantially linearly rising segment, followed at the intermediate position by a substantially linearly falling segment.

The plug member may comprise two sloping surfaces that meet at a spring engagement edge.

In a further embodiment the assembly may comprise two diametrically opposite slide springs in between which the plug member passes, the plug member being provided with two diametrically opposite spring engagement surfaces and the plug member often having either an elliptical or a rhombic cross-sectional shape.

The sliding component can be a keypad protection cover.

BRIEF DESCRIPTION OF THE DRAWINGS

In the following detailed portion of the present description, some embodiments of the invention will be explained in more detail with reference to the exemplary embodiments shown in the drawings, in which:

FIG. 3;

DETAILED DESCRIPTION OF THE INVENTION

The present invention is generally directed to sliding assemblies for telephone handsets. Generally, a keypad cover is slidably secured to the handset housing. Or, in some embodiments, the handset housing may comprise two parts that are slidably connected to one another. Hereafter, the word handset will be used to define the types of devices or products in which sliding assemblies as described here are to be used. Handset therefore encompasses mobile phones, also called cell phones, wireless phones, personal digital assistant (PDA) devices which may be provided with telecommunication means and/or gaming terminals also as may generally be provided with telecommunication means, as understood in the art, e.g. for communication use.

Figure 4:
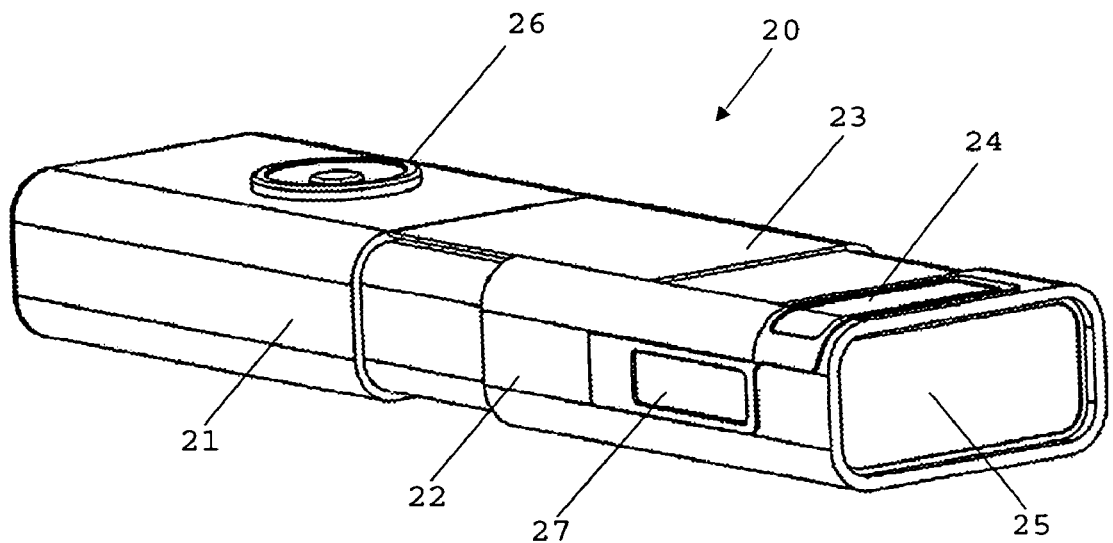
FIG. 4 is an isometric view of the mobile phone of FIG. 4 in an open position.

FIG. 1 shows a side view of a first embodiment of a slide assembly 2 for controlling the movement of a sliding keypad cover 3 of a handset 1 (as shown in FIG. 4, e.g.) along a slide path 5 between a first extreme position E1 and a second extreme position E2 via a predetermined intermediate position IP. The intermediate position IP can be in the middle between the extreme positions E1, E2, but this need not to be the case, when it may it may be desired in some circumstances to have the IP disposed at another location between E1 and E2.

The slide assembly 2 may include a rail or similar guide surface 6 for a guide shoe (not shown) connected to the keypad protection cover 3. The closed position of the keypad protection cover 3 corresponds to extreme position E1, shown by the continuous line type in FIG. 1a, whilst the open position of the keypad protection cover 3 corresponds to extreme position E2, shown by the dashed line type also in FIG. 1a.

The rail 6 extends substantially parallel along the guide path 5. A slide spring 7, which may in some embodiments be a non-linearly defined leaf spring 7, may be, as shown in the various views of FIG. 1, disposed in operative association with rail 6 also functionally interrelated with guide path 5. In some embodiments, a fixed end 8 of such a leaf spring 7 may be secured to the rail 6, whilst a free end 9 of the leaf spring 7 may rest on the rail 6. In the shown embodiments, the leaf spring 7 comprises a rising segment extending from the fixed end 8 until the intermediate position IP followed by a falling segment extending from the intermediate position IP to the free end 9. The leaf spring 7 can be curved, as shown, or comprise two or more linearly extending segments (not shown). Note further, the terms rising and falling, and as set forth below, upward, downward and sideward, inter alia, are terms of convention only, as they merely describe the views of FIG. 1. The assembly 2 may rather be disposed in any of a number of alternative dispositions such that the segments of a spring 7 may necessarily be otherwise situated and thus otherwise described, i.e., not as rising and falling, but perhaps as falling and rising, or as progressing in opposing lateral or diagonal directions, or otherwise depending upon the spatial and/or operational orientation of assembly 2.

A plug 4 provided with two sloping surfaces is secured to the cover 3 to move in unison therewith. The two sloping surfaces may meet at an obtuse angle to form a preferably rounded-off spring engagement edge. The spring engagement edge is the part of the plug 4 that engages the leaf spring 7 when the plug 4 is moved along the path 5. Note, in alternative unshown embodiments, other plug shapes may be used, as for example, and without limitation, sloping surfaces meeting at an acute angle, or presenting otherwise curved, non-angled engagement surface(s), inter alia.

Figure 1A:
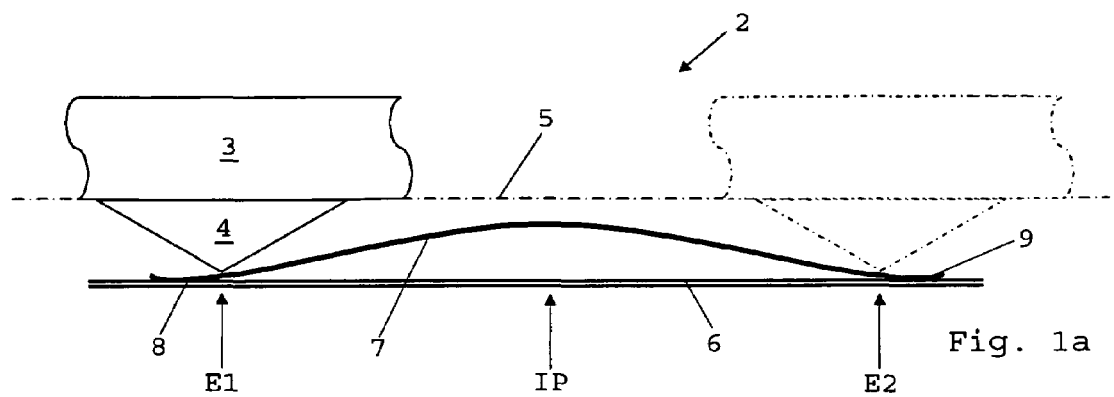
FIG. 1, which includes FIGS. 1a to 1c, provides diagrammatic side views of a first embodiment of the invention with the sliding member in different positions.
Figure 1B:
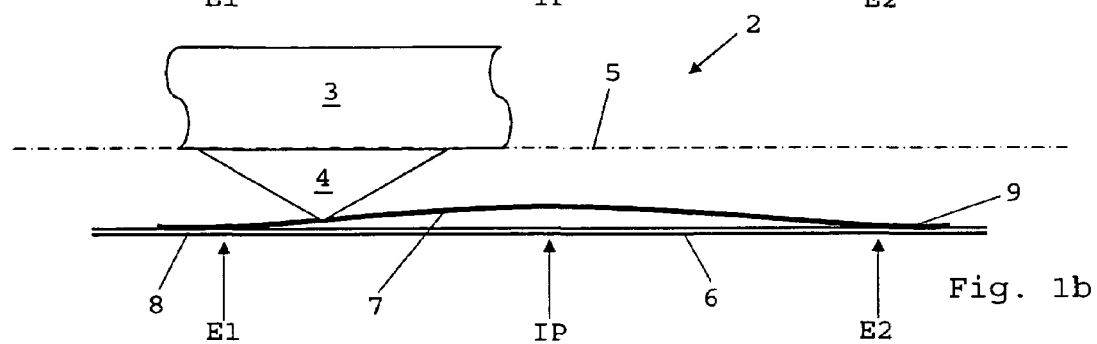
Figure 1C:
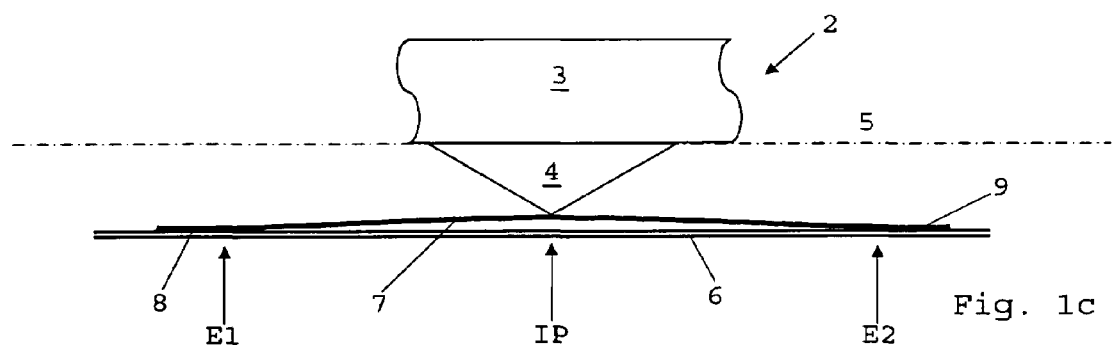

When the keypad protection cover 3 is, as shown in FIG. 1b, moved from the closed position (FIG. 1a) towards the open position, the plug member 4, specifically the spring engagement edge, presses the leaf spring 7 towards the rail 6. The leaf spring 7 deforms resiliently and applies a force to the plug 4. The force acting on the plug 4 has an upward and a sideward component, the latter urging the plug 4 and consequently also, the keypad protection cover 3 back to the closed position, at E1. The leaf spring applies a force urging the plug 4 and the keypad protection cover 3 back to the closed position when these elements are in any position between the closed position E1 and the intermediate position IP. The leaf spring 7 is increasingly deformed until the plug 4 and the keypad protection cover 3 reach the intermediate position as shown in FIG. 1c.

Then, when the combination of the plug 4 and the keypad protection cover 3 is positioned between the intermediate position and the open position of FIG. 1a (dashed line type) the leaf spring 7 applies a sideward force on the plug 4 that urges the latter towards the open position E2.

The slide assembly 2 may thus provide a characteristic that urges the cover 3 to either the open or the closed position, such positions effectively being in many embodiments the only useful stationary positions for the cover 3. If no substantial force acts on the cover 3, it will thereby be urged to stay in one of the extreme positions without the need for a locking device.

Figure 2:
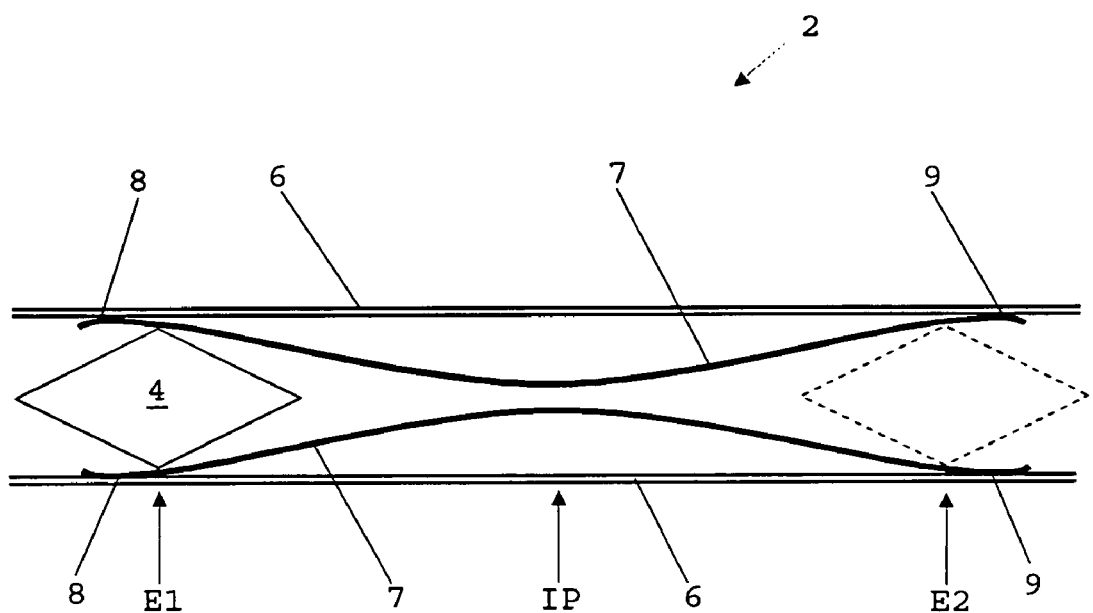
FIG. 2 is a diagrammatic side view of a second embodiment of the invention.

FIG. 2 is a cross-sectional view of a second embodiment of the invention. This embodiment effectively includes two diametrically oppositely disposed slide or leaf springs 7. A plug 4 member connected to a not shown keypad protection cover is provided with four sloping surfaces that meet at two diametrically oppositely disposed spring engagement edges. The plug 4 has a substantially rhombic cross-section in FIG. 2. When the cover 3 is moved from the closed position E1 to the open position E2 (indicted by the dashed lines in FIG. 2) and back, the plug member 4 is passed in between the leaf springs 7, thereby pressing both leaf springs 7 simultaneously towards their respective rails 6. The leaf springs 7 apply a countering forces urging the plug member 4 and consequently also the keypad protection cover back to the closed position when the latter is in any position between the closed position E1 and an intermediate position IP. The leaf springs 7 are increasingly deformed until the keypad protection cover reaches the intermediate position (not shown).

When the keypad protection cover 3 is positioned between the intermediate position IP and the open position E2 (shown dashed line type) the leaf springs 7 apply a sideward force on the plug 4 that urges the latter towards the open position E2.

Figure 3:
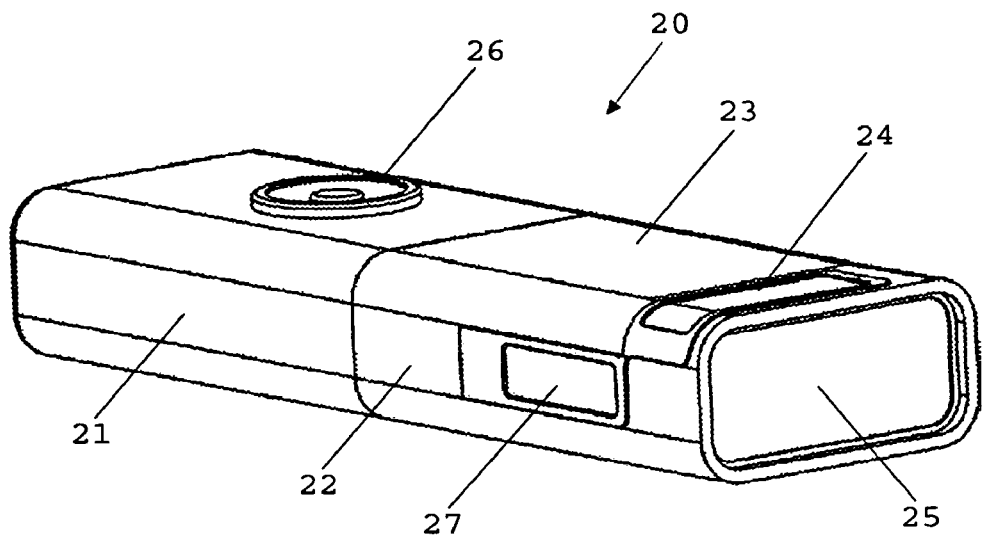
FIG. 3 is an isometric view of a mobile phone with a sliding protection cover in a closed position.

FIG. 3 is an isometric view of a handset in the form of a mobile phone 20. The mobile phone 20 includes a first housing part 21 and a second housing part 22 that is slidably movable relative to the first housing part between a closed (retracted) position shown in FIG. 3 and an open (extended) position shown in FIG. 4 in a telescopic manner. The mobile phone 20 is provided with a display 23, an opening to speaker 24, an end part of the mobile phone 25, a rotator 26 and a pad 27 for pushing the second housing part 22 to open/close.

When the rotator 26 is rotated the display 23 will respond by showing different items such as numbers, letters or functions, e.g. by showing one item from a group of items at a time on the display 23 and changing the shown item in an endless loop manner in response to rotational activation of the rotator 26.

When the desired item is found/shown on the display 23 the rotator 26 is pressed down and the item is selected. There can be up 4 softkeys (not shown). One example is to have two softkeys above and two softkeys below the rotator 26.

In certain operating modes of the phone, e.g. when a phone number has been dialed upon an incoming call, opening the second housing part 22 corresponds to an off-hook function. Closing the second housing part during an ongoing call corresponds to an on-hook function.

The mobile phone 1 is provided with a digital camera and associated camera lens (not shown: the lens is disposed on the side of the mobile phone opposite to pad 27). The camera lens is exposed when the second housing part 22 is opened. In some operating modes of phone, e.g. idle mode, opening the second housing part 22 causes the camera to be activated. Subsequent closing of the second housing part deactivates the camera and covers the camera lens.

Figure 5:
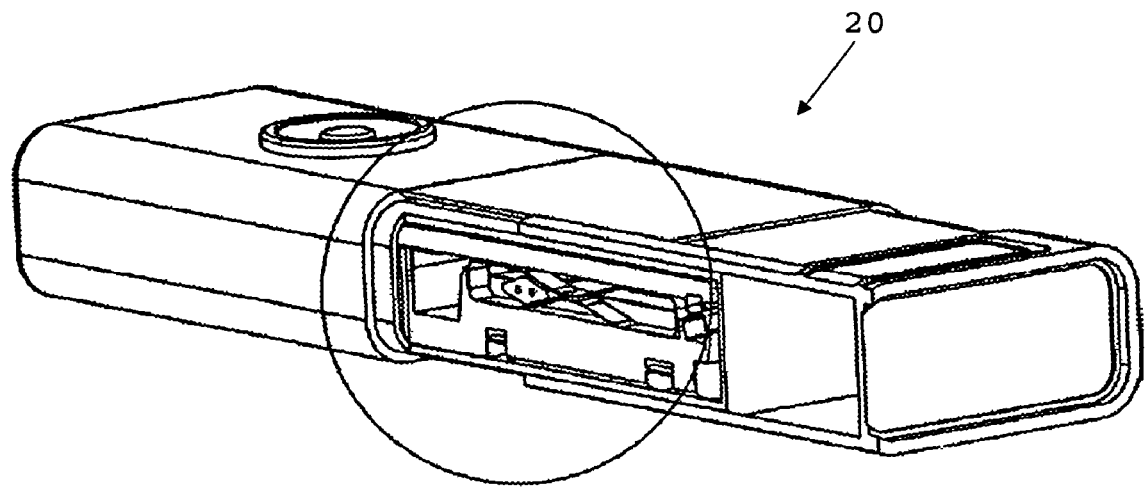
FIG. 5 is a is a cut-away view of a mobile phone.
Figure 5A:
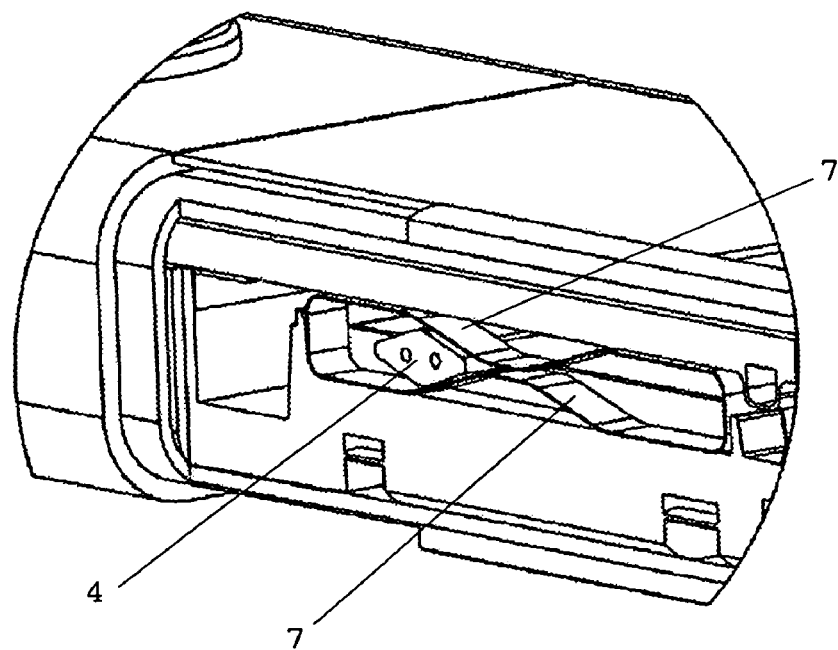
FIG. 5a is en enlarged section of FIG. 5.

FIG. 5 is a perspective cut-away view of the mobile phone 20 in the closed position. FIG. 5a shows the cutaway section of FIG. 5 in detail. The plug member 4 is connected to the slidable part 22 and moves in unison therewith. The slide springs 7 are diametrically oppositely arranged along the slide path.

Figure 6:
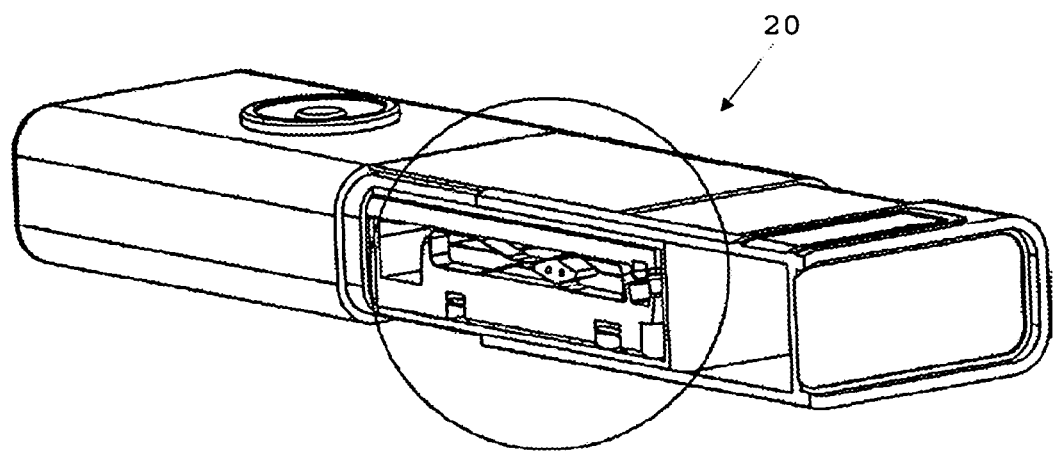
FIG. 6, is a is a cut-away view of FIG. 4.
Figure 6A:
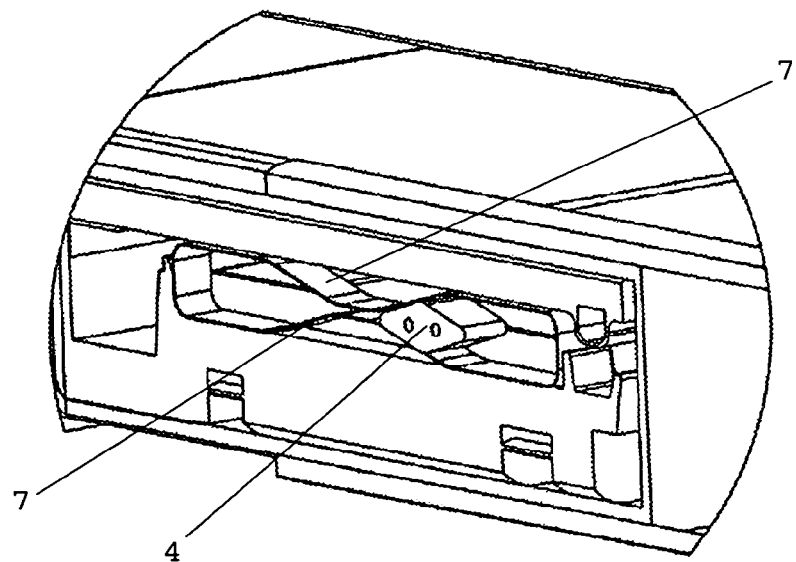
FIG. 6a is en enlarged section of FIG. 6.

When the slidable member 22 is moved from the closed position shown in FIG. 5 to the open position in FIGS. 6 and 6a the plug member 4 is forced between the slide springs 7. This construction results in the slide part having a stable open and closed position, whereas the slide spring construction urges the slidable part to either the open or the closed position when the slidable part is in an intermediate position between the open and closed positions.

As mentioned, the sliding assembly can be used for controlling the movement of a keypad protection cover or for controlling the relative movement of the parts of a two-part handset housing.

While the preferred embodiments of the device have been described in reference to the environment in which they were developed, they are merely illustrative of the principles of the invention. Other embodiments and configurations may be devised without departing from spirit of the invention and the scope of the appended claims.

The invention claimed is:

1. A slide assembly for controlling the movement of a sliding component of a handset along a slide path between first and second extreme positions via a predetermined intermediate position, said assembly comprising:
   at least one slide spring disposed along said slide path,
   a plug member connected to the sliding component to move in unison therewith,
   said slide spring and said plug member being configured to urge the sliding component towards the first extreme position when the sliding component is positioned between the first extreme position and said intermediate position, and
   said slide spring and said plug member being configured to urge the sliding component towards the second extreme position when the sliding component is positioned between the second extreme position and said intermediate position.

2. A slide assembly according to claim 1, wherein said slide spring is a leaf spring.

3. A slide assembly according to claim 1, wherein said slide spring has a fixed end adjacent one of said first and second extreme positions, and a free end adjacent the other of said first and second extreme positions, said slide spring extending between said free end and said fixed end in an unloaded state in a non-rectilinear fashion.

4. A slide assembly according to claim 1, wherein said plug member is guided along said path to engage and deform said slide spring, whereby a maximum deformation of said slide spring occurs at said intermediate position.

5. A slide assembly according to claim 1, wherein said plug member deforms said slide spring towards a rectilinear shape when said plug member moves from one of said extreme positions towards said intermediate position.

6. A slide assembly according to claim 1, wherein said slide spring in the unloaded state is curved, with a rising segment, followed at the intermediate position by a falling segment.

7. A slide assembly according to claim 1, wherein said slide spring in the unloaded state comprises a substantially linearly rising segment, followed at the intermediate position by a substantially linearly falling segment.

8. A slide assembly according to claim 1, wherein said plug member comprises two sloping surfaces that meet at a spring engagement edge.

9. A slide assembly according to claim 1, comprising two diametrically opposing slide springs in between which the plug member passes, the plug member being provided with two diametrically opposite spring engagement edges and the plug member preferably having either an elliptical or a rhombic cross-sectional shape.

10. A slide assembly according to claim 1, wherein said diametrically opposing slide springs are diametrically opposing leaf springs.

11. A slide assembly according to claim 1, wherein said first and second extreme positions are open and closed positions.

12. A slide assembly according to claim 1, wherein said sliding component is a keypad protection cover.

13. A slide assembly according to claim 1, wherein the slide assembly is configured in a handset having a first housing part and a second housing part, the slide assembly enabling movement of the second housing part relative to the first housing part between a retracted and an extended position.

14. A slide assembly according to claim 13, wherein the first housing part houses a camera and wherein movement of the second housing part to the extended position uncovers a camera lens and activates the camera.

15. A slide assembly according to claim 13 wherein movement of the second housing part to an extended position actuates an off-hook function of the handset and movement to a retracted position activates an on-hook function of the handset.

16. The slide assembly according to claim 13, wherein the second housing part comprises a keypad protection cover and in the retracted position the keypad cover is in a closed position and in the extended position the keypad cover is in an open position.

17. A phone handset comprising:
   a handset body having a keypad, and
   a sliding keypad protection cover assembly for controlling the movement of a sliding component along a slide path between first and second extreme positions via a predetermined intermediate position, said sliding keypad protection cover assembly comprising:
      at least one slide spring disposed along said slide path,
      a plug member connected to the sliding component to move in unison therewith,
      said slide spring and said plug member being configured to urge the sliding component towards the first extreme position when the sliding component is positioned between the first extreme position and said intermediate position, and
      said slide spring and said plug member being configured to urge the sliding component towards the second extreme position when the sliding component is positioned between the second extreme position and said intermediate position.

18. A method for controlling the movement of a sliding component of a handset along a slide path between first and second extreme positions via a predetermined intermediate position, said method comprising:
   sliding a plug member in a slide path between first and second extreme positions via an intermediate position, the plug member being connected to the sliding component to move in unison therewith;
   using at least one slide spring disposed along the slide path between first and second extreme positions, to engage and urge the plug member towards the first extreme position when the plug member is positioned between the first extreme position and said intermediate position, and urge the plug member towards the second extreme position when the plug member is positioned between the second extreme position and said intermediate position.

19. A telephone handset comprising a first housing part and a second housing part, the second housing part being telescopically movable relative to the first housing part between a retracted and an extended position, and a slide assembly for controlling the movement of a sliding component of the handset along a slide path between the retracted and extended position via a predetermined intermediate position, the assembly comprising:

at least one slide spring disposed along said slide path, a plug member connected to the sliding component to move in unison therein, said slide spring and said plug member being configured to urge the sliding component towards the retracted position when the sliding component is positioned between the retracted position and said intermediate position, and said slide spring and said plug member being configured to urge the sliding component towards the extended position when the sliding component is positioned between the extended position and said intermediate position.

20. Then telephone handset of claim 19 wherein a telephone handset further comprises a camera with a camera lens in the first housing part and whereby a movement of the second housing part from the retracted to the extended position uncovers the camera lens and activates the camera and vice versa.

21. A telephone handset of claim 19, wherein said slide spring has a fixed end adjacent one of said first and second extreme positions, and a free end adjacent the other of said first and second extreme positions, said slide spring extending between said free end and said fixed end in an unloaded state in a non-rectilinear fashion.

* * * * *